Feb. 6, 1962 H. K. ROBIN 3,020,342

READER SYSTEMS

Filed May 29, 1958 2 Sheets-Sheet 1

HAROLD KILNER ROBIN
Inventor
By Cushman, Darby & Cushman
Attorneys

HAROLD KILNER ROBIN
Inventor
By Cushman, Darby & Cushman
Attorneys

United States Patent Office 3,020,342

Patented Feb. 6, 1962

3,020,342

READER SYSTEMS

Harold Kilner Robin, Tunbridge Wells, England, assignor to National Research Development Corporation, London, England, a British corporation Filed May 29, 1958, Ser. No. 738,724
Claims priority, application Great Britain May 30, 1957
12 Claims. (Cl. 178—52)

The present invention relates to a reader system and may particularly be adapted for reading a punched tape used in a multi-channel teleprinter system.

In multi-channel teleprinter systems, the channels are often transmitted in time-division multiplex. That is to say, signals representing elements of a plurality of messages are transmitted in a time sequence, an element of the first message being followed by an element of a second message and so on until an element of the last message of the plurality is transmitted, when a second element of the first message is transmitted and so on. Each element of a message represents a symbol (such as a letter or a space between words) and consists, in the final event of a multi-unit code.

The multi-unit code comprises a number of marks or spaces. In this context, the term mark implies the presence of a signal of one type and the term space implies the presence of a signal of another and distinctive type (or indeed the absence of a signal) in a particular special or temporal position in the code.

The symbols in the multi-unit code, for example, as derived from a paper tape may be presented in parallel form one symbol at a time to a device for translating the symbols into a suitable modulation signal for modulating a radio transmitter.

It is an object of the present invention to provide a reader system for reading a plurality of perforated carriers (for example, perforated cards or tapes) in time-division multiplex.

It is a further object of the present invention to provide a reader system capable of being arranged for use in converting light signals received in time-division multiplex in a parallel form of multi-unit code into electric pulses suitable after amplification either for modulating a radio transmitter with signals having frequencies which are determined by the elements of the multi-unit code or the direct transmission of the signals over a land-line.

According to the present invention there is provided a multi-channel reader system for reading a multi-unit code in time-division multiplex including a rotatable reading head having a plurality of photoelectric devices equal in number to the number of units in the multi-unit code housed therein, a plurality of projection systems disposed round the reading head so as to project light towards the reading head and means for rotating the reading head so that the photo-electric devices may receive light from each projection system in turn.

Figure 1:
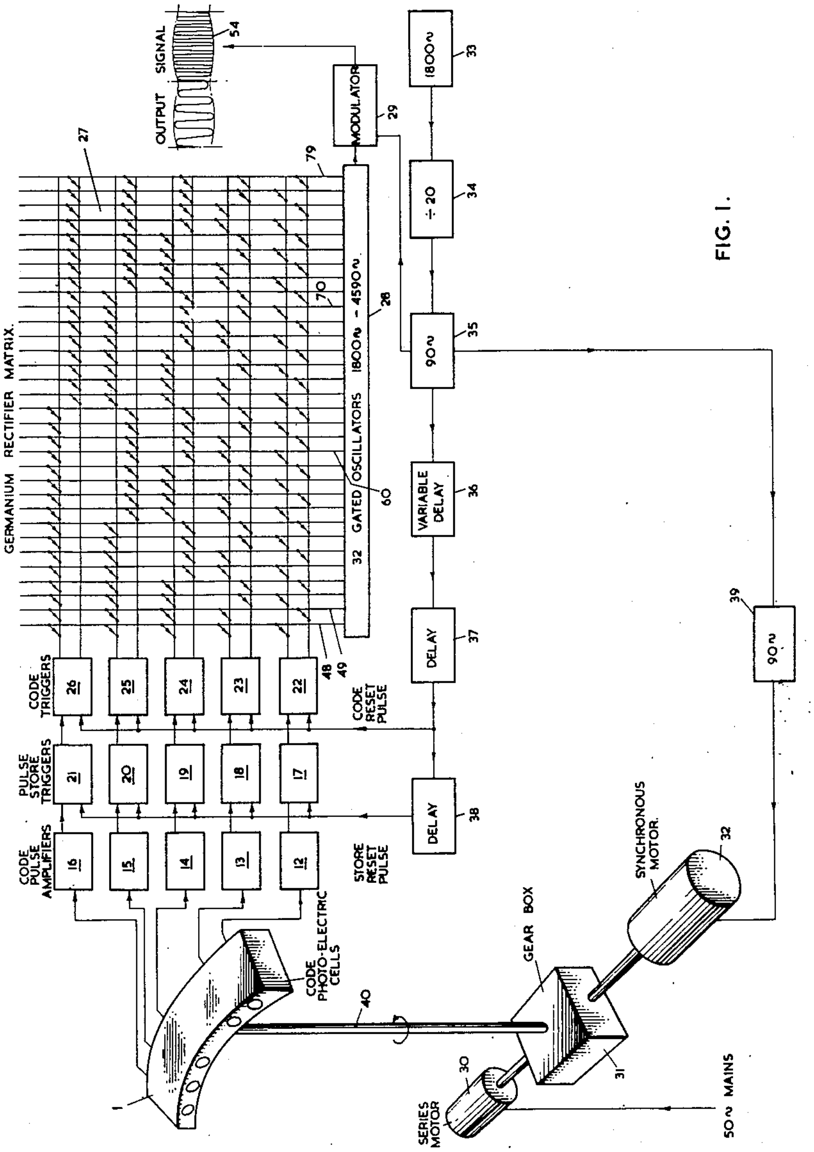
Figure 2:
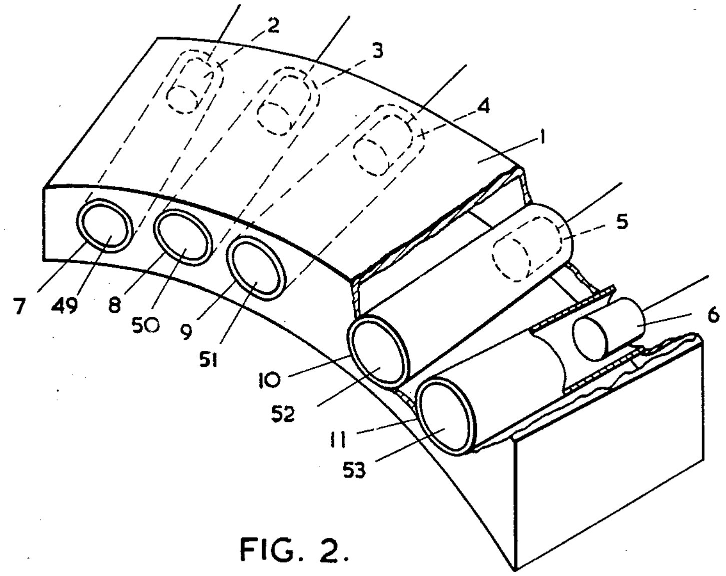
Figure 3:
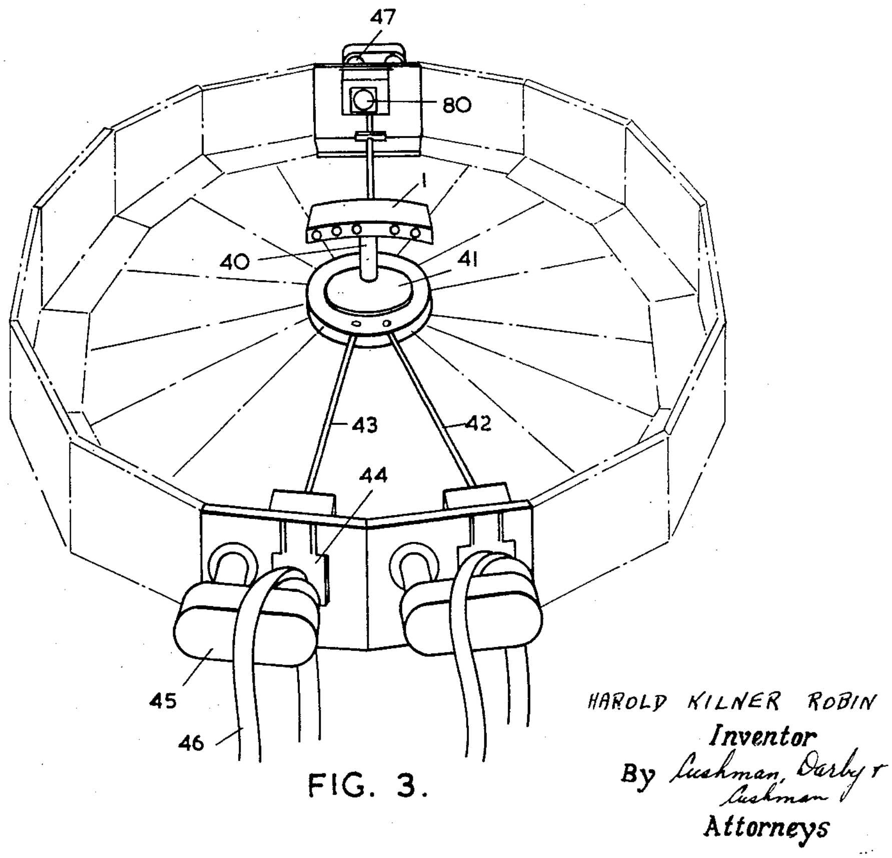

The invention will now be described, by way of example only, with reference to the accompanying drawings in which;

FIGURE 1 is a part schematic, part perspective, diagrammatic illustration of a reader system, FIGURE 2 is an enlarged perspective view part in section of a reader head shown in FIGURE 1, and FIGURE 3 shows part of the mechanical arrangement of the reader system.

The same reference numerals are used in the three figures for the various components of the system.

In FIGURES 1, 2 and 3 each photoelectric cell of a group of photoelectric cells 2 to 6 is mounted at the end of a separate hollow cylindrical tube of a group of hollow cylindrical tubes 7 to 11 having ends open on a concave face of a reading head 1 as shown in the drawing. Each photoelectric cell is connected through a slip ring (not shown) to a separate code pulse amplifier of a group of amplifiers 12 to 16, a pulse store trigger of a group of triggers 17 to 21 and a code trigger of a group of triggers 22 to 26. The outputs of the code triggers 22 to 26 are fed into a germanium rectifier matrix 27.

The outputs of the garmanium rectifier matrix are fed into gated oscillators 28 (not shown separately). The output of the gated oscillators and a 90 c.p.s. synchronising frequency is fed into a modulator 29.

The reading head 1 is rotated by a shaft 40 driven by a motor 30 in combination with a gear box 31 and a synchronous motor 32.

A standard frequency source 33 is fed into a divider circuit 34, a first output stage 35, a variable delay unit 36 a delay unit 37 and a delay unit 38.

The output of delay unit 37 is also fed onto the input of the code triggers 22 to 26 and the output of delay unit 38 is fed on to the inputs of the pulse triggers 17 to 21.

The output from the first output stage 35 is fed onto a second output stage 39 and the output from the second output stage 39 is fed onto the synchronous motor 32.

The shaft 40 also rotates an eccentric mechanism 41 which operates piston rods, for example the piston rods 42 and 43. Each piston rod operates a standard type of teleprinter gate such as the teleprinter gate 44. A lamp assembly of a group of lamp assemblies (for example, the lamp assembly 45) focuses light (by, for example, a lens 47) through tape 46 perforated in accordance with a multi-unit code onto the reader head 1.

The reader system shown in FIGURES 1, 2 and 3 operates in the following manner. For one channel of a multi-channel system a symbol in multi-unit code of a message is punched across a tape 46. This tape 46 is made to advance symbol by symbol (that is to say, line by line) by the teleprinter gate mechanism 44 which is operated by the piston 43 which is attached to the eccentric mechanism 41. The eccentric mechanism 41 is rotated by the shaft 40 to which it is directly attached. The shaft 40 rotates at 360 revolutions per minute. The reading head 1, being directly attached to the shaft 40, also rotates at 360 revolutions per minute.

The shaft 40 is rotated by the motor 30 via the gear box 31. The rotation of shaft 40 is synchronised to rotate at 360 revolutions per minute by the synchronous motor 32. The synchronous motor 32 is driven by the second output stage 39 which is driven by the first output stage 35, the divider circuit 34 and the constant frequency source 33. The standard frequence source 33 may conveniently be a tuning fork of 1800 cycles per second, the vibrations of which are critically controlled by suitable devices.

The frequency of 1800 cycles per second derived from the standard source 33 is divided by 20 by the divider 34, which may be any suitable circuit. The output from the divider 34 will then be 90 cycles per second and is supplied to the synchronous motor 32 via the first and second output stages 35 and 39 and to the modulator 29 via the output stage 35.

The synchronous motor 32 may conveniently run at 2700 revolutions per minute and the gear box 31 may conveniently have a ratio of 7.5 to 1. Shaft 40 will then rotate at 360 revolutions per minute.

Light from the light source 45 traverses the perforations in the teleprinter tape and a lens 80 on the teleprinter gate mechanism 44 focusses the perforations in the perforated tape at the reading head 1. Lenses 49 to 53 focus the images of the perforations imaged by the lens 80 of the gate mechanism 44 onto the photoelectric cells 2 to 6. Each perforation of a symbol is focussed substantially simultaneously with the other perforations (if present) of the symbol onto a separate photoelectric cell of the group of photoelectric cells 2 to 6. The number of units in the multi-unit code is the same number as the number of photoelectric cells in the reading head 1. It is preferable to use photoelectric germanium diodes or photoelectric transistors due to their small light sensitive area and circular cylinders 7 to 11 of approximately ⅜" diameter and 2" long. A photoelectric cell of the group of cells, 2 to 6 is placed one at the end remote from the light sources of each cylinder of the group of cylinders 7 to 11.

The reason for this arrangement of lenses and hollow tubes is to make the light acceptance angle of the photoelectric cells 2 to 6 small in order that light emanating from two or more perforations does not fall on the same photoelectric cell.

Each output electric pulse of each photoelectric cell of the group 2 to 6 is fed via a slip ring (not shown) on the shaft 40 into a separate one of the group of code pulse amplifiers 12 to 16 the output of which is applied to a separate pulse store trigger of the group of triggers 17 to 21. The outputs of the photoelectric cells is stored on the group of store triggers 17 to 21 until they are reset by a pulse from the delay 38. When the store triggers are reset, the stored outputs are immediately set up on the group of code triggers 22 to 26 which have been just previously reset by the output of the delay 37. The delay 38 introduces a delay of only a few microseconds. The code triggers 22 to 26 are, therefore, set up for set periods, just less than 1/90 of a second under the control of the oscillator 33.

In FIGURES 1, 2 and 3 there is shown a five-unit code system as used in teleprinter system but any reasonable number of units could of course be used without deviating from the spirit of the invention.

The reader head 1 is made to rotate and so it scans a symbol from each teleprinter channel in time sequence in a time-division multiplex manner. Having scanned one symbol of each message the reading head scans the next symbol of each message and so on until the complete messages one per channel have been completely scanned.

The outputs of the code triggers 22 to 26 in the five-unit binary code are fed on to a rectifier matrix 27 which is shown in FIGURE 1. Details of a rectifier matrix for converting from binary to octal code is given in a book entitled "High Speed Computing Devices" by C. B. Tomkins, J. H. Wakelin, W. W. Stifler at page 40, Section 3–4 and illustrated in FIGURES 4–3*a* on page 42. The rectifier matrix 27 shown in FIGURE 1 converts the five-unit binary code into a one out of thirty-two unit code in a similar manner.

The thirty-two outputs 48 to 79 of the rectifier matrix are connected to thirty-two oscillators 28, one output of each of the outputs 48 to 79 being connected one to each of the inputs of the thirty-two oscillators 28. The thirty-two oscillators 28 are normally not oscillating but one of them corresponding to a particular symbol commences to oscillate when a suitable pulse is received from the rectifier matrix on its input.

The system shown in FIGURES 1, 2 and 3 works on the standard teleprinter five-unit code and any one of the oscillators 28 is selected to oscillate, the selection depending upon the symbol represented in the five-unit code.

The outputs from the oscillators 28 are fed into a modulator 29 which is used to modulate a transmitter or, alternatively, may be used directly to cause transmission over a land-line.

It will be remembered that the shaft 40 rotates at 360 revolutions per minute which is 6 revolutions per second. Since the reader system shown in FIGURES 1, 2 and 3 has fifteen teleprinter gating heads for example 44 the reader head 1 sweeps 90 symbols per second, one symbol per teleprinter gating mechanism per revolution.

Each teleprinter gate contains a different message and so the messages are time-division multiplexed.

The 90 symbols per second from the reader head 1 are fed into the rectifier matrix 27 via the various pieces of circuitry as hereinbefore described. The symbols cause oscillators 28 to oscillate as hereinbefore described. The oscillators 28 cover a range of frequencies from 1800 c.p.s. to 4590 c.p.s. in steps of 90 cycles, in other words there are 32 distinct frequencies between and including 1800 c.p.s. and 4590 c.p.s.

The 32 frequencies corresponding to the various symbols are also amplitude modulated by a 90 c.p.s. frequency from the output stage 35, as shown at 54, FIGURE 1.

The percentage amplitude modulation may be of the order of 25%.

The 90 c.p.s. amplitude modulation is used for synchronisation purposes at a receiver (not shown). The waveform shown at 54, FIGURE 1, may be used for direct transmission over a land-line or for modulating a carrier wave, if radio transmission is used.

I claim:

1. A reader system for reading a multi-unit code in time-division multiplex including a rotatable reading head, a plurality of lenses in the reading head, a plurality of photo-responsive cells situated one behind each lens in the reading head, means for rotating the reading head, a plurality of projection systems disposed round and spaced from the reading head and in each projection system means for projecting light simultaneously from each of a plurality of discrete areas in the projection system representing different units of the code through a separate one of the said lenses on to its associated photo-responsive means, as the reading head is rotated.

2. A reader system as claimed in claim 1 and wherein each projection system includes a gate mechanism for feeding a perforated carrier through the system and an optical system for projecting light through holes, if any, in the carrier on to the reading head when each of the said holes is in register with a separate one of the said discrete areas.

3. A reader system as claimed in claim 1 wherein a face of the reading head is concave and has apertures formed therein and the optical axes of the said lenses pass through the said apertures along radii of curvature of the face.

4. A reader system as claimed in claim 2 and wherein the carrier is a paper tape.

5. A reader system as claimed in claim 1 and wherein each of the photo-responsive cells is connected to a decoding circuit for converting each permutation of a multi-unit code into a separate single output signal.

6. A reader system for reading a multi-unit code in time-division multiplex and including a rotatable reading head having a plurality of photo-electric cells equal in number to the number of units in the multi-unit code housed therein, a plurality of projection systems disposed round the reading head so as to project light towards the reading head, an oscillator, a synchronous motor synchronized with the oscillator for rotating the reading head so that the photo-electric cells may receive light from each projection system in turn, a separate storage trigger connected to an output of each photo-electric device, a separate code trigger connected to an output of each storage trigger, means for applying reset pulses timed by the oscillator to reset the code triggers, delay means connected to the storage triggers, means for applying the reset pulses to the delay means so that the storage triggers are reset and set up the code triggers after the code triggers have been reset and a matrix connected to the code triggers for converting the code set up on the code triggers into an output on any single one of a plurality of output lines.

7. A reader system as claimed in claim 6 and wherein there is provided a separate oscillator connected to each output line from the matrix so as to oscillate only when an output occurs on that line.

8. A reader system as claimed in claim 1 wherein each projection system includes a lens for concentrating light on to the lenses in the reading head.

9. A reader system for reading a multi-unit code in time-division multiplex including a rotatable reading head having a plurality of photo-electric cells equal in number to the number of units of the multi-unit code housed therein, a plurality of projection systems disposed round the reading head so as to project light towards the reading head, means for rotating the reading head so that the photo-electric cells may receive light from each projection system in turn, an eccentric device connected to rotate with the rotatable reading head, a gate mechanism in each projection system for advancing perforated carriers one line at a time through the projecion system and a piston connected between the eccentric device and each gate mechanism so as to operate the gate mechanism once each revolution of the reading head.

10. A multi-channel reader system for reading multi-unit code representations in time-division multiplex and including a reading head rotatable about an axis, means for rotating the reading head about the said axis, and a plurality of projection systems disposed around the head in a plane at right angles to the said axis so as to project light towards the reading head and wherein the reading head has a plurality of photo-responsive devices, equal in number to the number of units in the code, arranged in a plane at right angles to the said axis and a separate lens means associated with each photo-responsive device for restricting light emanating from a discrete area in each projection system in turn to focus on to its associated photo-responsive device as the reading head is rotated.

11. A multi-channel reader system as claimed in claim 10 and wherein each projection system includes a gate mechanism for feeding through the projection system a carrier having holes formed therein representing units of a multi-unit code, at least some of the holes formed in the carrier lying one in each of at least some of the discrete areas in the projection system, and means for operating the gate mechanism once each revolution of the reading head.

12. A multi-channel reader system as claimed in claim 11 and wherein the carrier is a paper tape one transverse line of which corresponds to the number of units in the multi-unit code.

References Cited in the file of this patent

UNITED STATES PATENTS

| | | |
|---|---|---|
| 1,966,354 | Noxon | July 10, 1934 |
| 2,477,821 | Potts | Aug. 2, 1949 |